United States Patent

[11] 3,628,755

[72] Inventor Bruno Nagler
     New York, N.Y.
[21] Appl. No. 883,420
[22] Filed Dec. 9, 1969
[45] Patented Dec. 21, 1971
[73] Assignee Verti-Dynamics
     New York, N.Y.

[54] HELICOPTER WITH SHROUDED ROTOR AND AIRSCOOP CONFINED WITHIN TEARDROP CONFIGURATION OF THE FUSELAGE
12 Claims, 4 Drawing Figs.

[52] U.S. Cl. .................................................. 244/17.21
[51] Int. Cl. .................................................. B64c 27/22
[50] Field of Search .......................................... 244/17.19,
     17.21, 17.23, 17.11, 6, 7

[56] References Cited
UNITED STATES PATENTS
1,887,703  11/1932  Vaughn .................. 244/17.21
2,041,789  5/1936   Stalker .................. 244/17.19
2,481,749  9/1949   Hiller, Jr. ............... 244/17.19
2,547,255  4/1951   Bruel .................... 244/17.19

Primary Examiner—Milton Buchler
Assistant Examiner—Paul E. Sauberer
Attorney—Nolte and Nolte ABSTRACT: An aircraft with a shrouded rotor and airscoop confined within the classic teardrop configuration of the fuselage. The aircraft may be a helicopter and is therefore additionally provided with rotary wings. The aircraft, moreover, has an airscoop channel, the entry of which is located in the fuselage at the place where the laminar flow of air breaks up into turbulent air. Thus, the air is drawn into the confined air channel, and propelled or pushed out by the rotor facing the rear of the fuselage. The fuselage is furthermore constituted of two interconnected sections. The shrouded rotor forms the connection between the front and rear sections of the fuselage. In addition, the rotor is provided with an elongated hub having spaced ribs thereon, the ribs forming a support for the tail structure of the aircraft. Thus, the outer configuration of the fuselage is maintained and, at the same time, a shrouded rotor is provided which functions effectively due to the location of the airscoop.

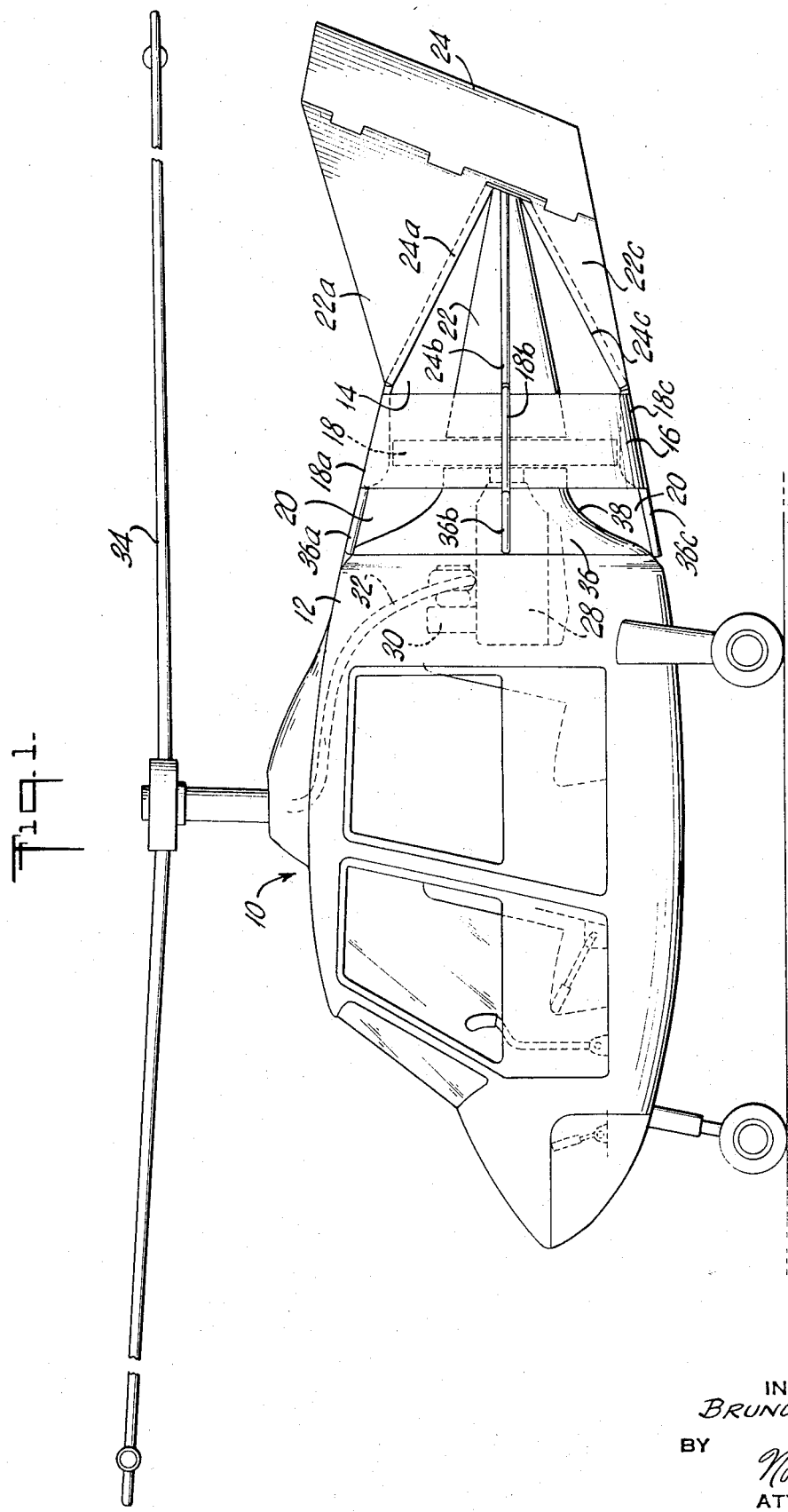

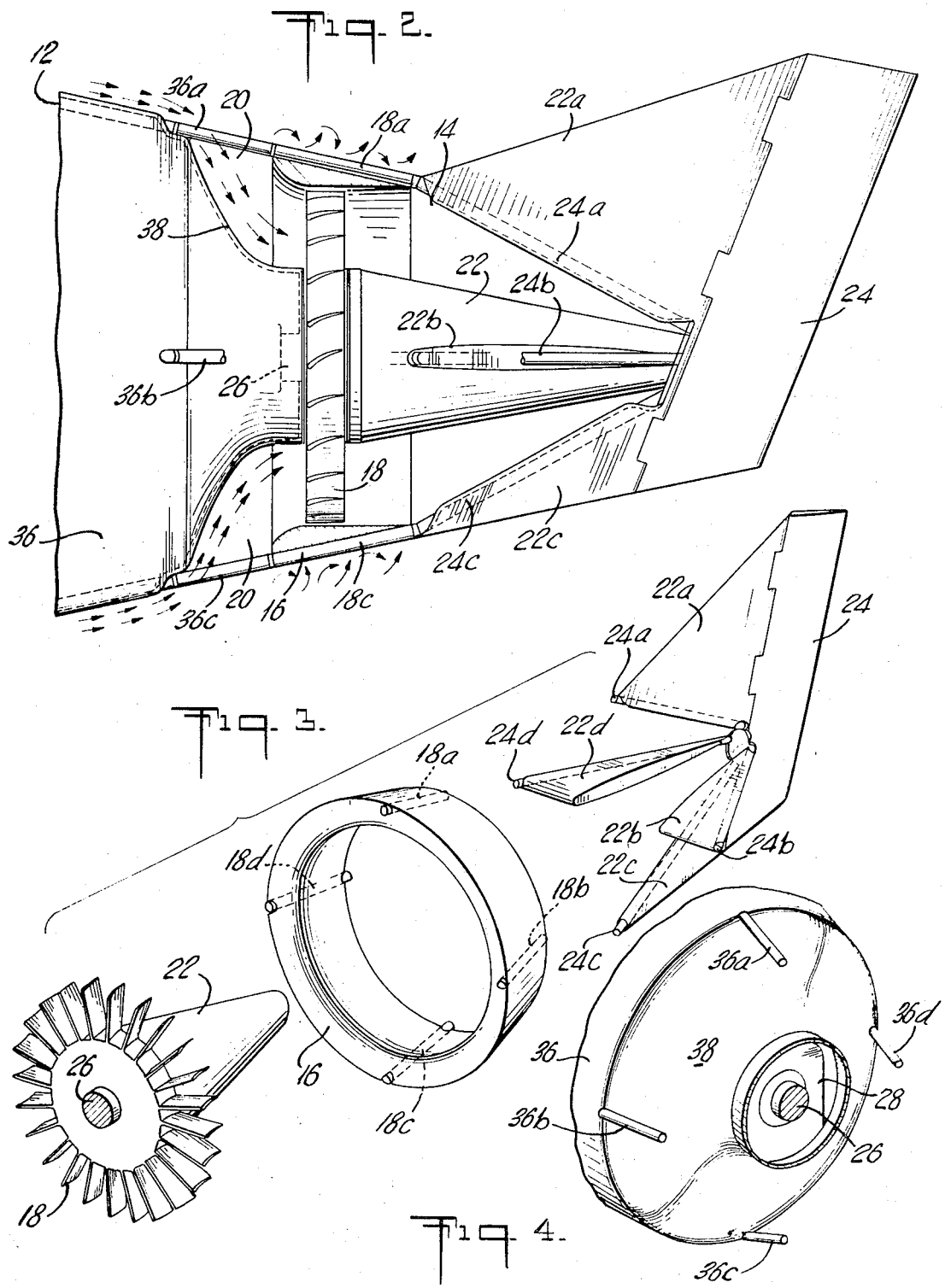

HELICOPTER WITH SHROUDED ROTOR AND AIRSCOOP CONFINED WITHIN TEARDROP CONFIGURATION OF THE FUSELAGE

BACKGROUND OF THE INVENTION

Aircraft are known having rotors facing the rear of the fuselage, which are known as pusher propellers, usually unprotected, and their effectiveness could be improved.

It is an object of the present invention to maintain the teardrop configuration of the fuselage and at the same time to maintain and provide a shrouded rotor facing the rear of the fuselage. The fuselage is therefore provided with an airscoop which directs the air into a confined chamber leading to the rotor blades thereby making the rotor more efficient and safe. The airscoop is so located on the fuselage at a position whereby the laminar flow of air breaks up into a turbulent airflow. At this point, a vacuum is created and the turbulent air is drawn in through the conduit of the airscoop into the confined area of the shrouded rotor. The rotor is provided also with an elongated hub upon which are mounted four open rib arrangements. These ribs support the tail assembly and also permit the free passage of air from the rotor rearwardly. It should be noted that the aircraft may also be provided with a rotary wing thereby converting the same into a dual-mode aircraft, such as a helicopter, as well as a pusher-type aircraft. In addition, two motors may be mounted within the fuselage to power both the rotor and the rotary wing aircraft. Thus, the present construction takes advantage of the tendency of the laminar airflow over an airfoil to break up at a certain point over the airfoil and create air turbulences. Accordingly, these turbulences are converted into useful airmasses which are conducted through channels or conduits into a shrouded rotor. The aircraft ribs may be simply connected to the shroud of the rotor by means of pipe connections. Thus, the rear fuselage section may be easily mounted and dismounted from the shroud.

It is a principal object of the present invention to provide an aircraft in which the peripheral teardrop-shaped configuration of the fuselage is maintained even though an airscoop and a shrouded rotor facing the rear of the fuselage are utilized in the construction.

A practical embodiment of the invention is represented in the accompanying drawings, in which:

FIG. 1 is a side elevation view of the helicopter with the shrouded rotor and airscoop constructed in accordance with the teachings of the present invention;

FIG. 2 is an enlarged partial sectional view of FIG. 1 showing the rear tailpiece assembly which includes details of the airscoop and the shrouded rotor;

FIG. 3 is an exploded view of the details of construction of FIG. 2 showing the rotor, shroud, ribs, and tailpiece construction; and FIG. 4 is a partial perspective view of the section of the front fuselage which connects to the shrouded rotor and in which a part of the airscoop is located.

Referring to the drawings and especially FIG. 1 thereof, a helicopter is shown and is identified generally by the reference number 10. However, it should be noted that the aircraft contemplated in the present invention does not necessarily have to be a helicopter, but any type of pusher-type propeller aircraft may be utilized within the concept of the present invention.

The helicopter 10 is provided with a fuselage that is divided into two sections, i.e., a front section 12 and a rear section 14. The front section and rear section are removably interconnected by means described hereinafter. Located between the front section 12 and the rear section 14 of the fuselage is a rotor shroud structure 16 which houses a rotor unit 18. The configuration of shroud 16 is clearly seen in FIG. 4 of the drawings. Air entry to the pusher rotor 18 is provided by means of an airscoop 20 which is an annular structure surrounding the fuselage. The rotor is provided with an elongated hub 22 which extends preferably rearwardly to the tail assembly 24 of the aircraft. The rib assembly is provided with four ribs 22a, 22b, 22c, and 22d, all as clearly shown in FIG. 3. The ribs 22a–22d are each provided with corresponding pipe connections 24a–24d which interfit into the coupling pipes 18a–18 of the shroud 18. Thus, the rear tail section of the fuselage may be removably connected to the rotor shroud 18. In any event, the air propelled by the rotor 18 in a rearwardly direction passes out of the fuselage in the open areas between the ribs 22a–22d. As seen in FIG. 1, the rotor shaft 26 is operatively connected to an engine 28. The engine here shown is of the internal combustion type; however, it is not intended to be limited to an engine of this type, it being understood that other engines or prime movers may be used within the spirit and scope of the present invention. Also operatively connected to the engine 28 is a compressor 30 from which a pipe 32 conducts compressed air to the rotary wings 34 of a helicopter aircraft in a conventional manner. It is to be understood that two engines may be substituted for the single engine in the present invention, in which one engine operates the rotor 18 and the other engine supplies the motive fluid to the rotary wings 34.

FIG. 4 shows a section 36 of the front fuselage part 12. This section 36 is provided with a curved surface 38 forming a wall of the airscoop 20. Moreover, mounted on the peripheral edge of the section 36 are a plurality of spaced pipes 36a–36d which are adapted to also interfit in the pipe connections 18a–18d of rotor shroud 18. Therefore, the front fuselage section by means of uncoupling pipes 36a–36d of front fuselage section 36 from pipe connections 18a–18d of the rotor shroud 18.

Referring to FIG. 2, it should be noted that the airflow along the front section 12 of the fuselage is laminar. However, when the airflow moves over the rear section 14 of the fuselage the same becomes turbulent and therefore is reduced in effectiveness. Accordingly, the airscoop 20 is located at a place on the fuselage where laminar flow changes to a turbulent flow and thereby draws in, by vacuum action, the airflow into the interior of the rotor 18 in order to effectively confine the air within the rotor structure. Thus, the air turbulences are converted into useful airmasses, which are confined in the channels or conduits constituting the airscoop 20 and are directed to the shrouded rotor 18. Moreover, the peripheral, tear-shaped configuration of the fuselage is maintained even though an airscoop and a shrouded rotor facing the rear of the fuselage are utilized in the present invention. It should also be noted that the rib constructions of 22a–22d are rigid members that connect at four points to the shroud 18. In this manner, a rigid structural tail assembly is maintained; however there are ample openings for expelling air from the rotor in a rearwardly direction.

What is claimed is:

1. An aircraft comprising separable front and rear sections, a shroud between said sections, said sections and shroud together forming a teardrop-shaped fuselage, a pusher propeller between the sections enclosed by the shroud and an airscoop defined by the shroud and a rearward part of the front section which is shaped to lead air to the pusher propeller and at a position on the teardrop-shaped fuselage where airflow over the fuselage changes from laminar to turbulent flow, said scoop being shaped to direct substantially all air passing therethrough to the pusher propeller.

2. An aircraft as claimed in claim 1 wherein said propeller is provided with an elongated hub, the rear section of the fuselage having at least four spaced ribs mounted adjacent to said hub and extending rearwardly thereby providing spaces therebetween for the propeller airflow, and at least one of said ribs supporting a tail section of said aircraft.

3. An aircraft as claimed in claim 2, wherein said ribs are provided with means for rapidly connecting and disconnecting said rear fuselage section to said rotor shroud.

4. An aircraft as claimed in claim 3, wherein said separable front section is provided with interfitting pipe sections insertable into said rotor shroud.

5. An aircraft as claimed in claim 4 wherein said separable front section has a curved, reduced surface facing rearwardly and forming one wall of said airscoop, said shroud having a surface in space-confronting relationship with said curved, reduced surface of the front section to form the airscoop channel.

6. An aircraft as claimed in claim 5 wherein said airscoop is an annular channel passing through all of the blades of said rotor.

7. An aircraft as claimed in claim 3, wherein said means for rapidly connecting and disconnecting said rear fuselage section to said rotor shroud are interfitting pipe sections.

8. An aircraft as claimed in claim 1 wherein said airscoop comprises a confined channel directing substantially all air to the rotor blades of said rotor.

9. An aircraft as claimed in claim 8, wherein said fuselage is provided with a tail section, and said rotor blows air over certain external surfaces of said tail section.

10. An aircraft as claimed in claim 1 wherein said rearward part of the front section is tapered smoothly to the hub of the pusher propeller.

11. An aircraft as claimed in claim 10 wherein said propeller has a rearwardly extending hub constituting a structural part of the connection of said front and rear sections.

12. An aircraft as claimed in claim 1 wherein a motor drivingly connected to the pusher propeller is mounted within said front section.

* * * * *